(12) United States Patent
Fertig et al.

(10) Patent No.: US 8,166,239 B2
(45) Date of Patent: Apr. 24, 2012

(54) TRANSLATION LOOKASIDE BUFFER AND RELATED METHOD AND PROGRAM PRODUCT UTILIZED FOR VIRTUAL ADDRESSES

(75) Inventors: Matthias Fertig, Altdorf (DE); Ute Gaertner, Schoenaich (DE); Norbert Hagspiel, Wendlingen (DE); Erwin Pfeffer, Lam (DE)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/142,885

(22) Filed: Jun. 20, 2008

(65) Prior Publication Data

US 2008/0320216 A1    Dec. 25, 2008

(30) Foreign Application Priority Data

Jun. 21, 2007    (EP) ..................................... 07110710

(51) Int. Cl.
*G06F 12/00* (2006.01)
*G06F 13/00* (2006.01)
*G06F 13/28* (2006.01)
(52) U.S. Cl. ................. 711/108; 711/205; 711/E12.001
(58) Field of Classification Search .................. 711/108, 711/205, E12.001
See application file for complete search history.

(56) References Cited

U.S. PATENT DOCUMENTS

| | | | |
|---|---|---|---|
| 5,317,705 A | 5/1994 | Gannon et al. ................. 395/400 |
| 5,386,527 A * | 1/1995 | Bosshart ........................... 711/3 |
| 5,586,283 A * | 12/1996 | Lopez-Aguado et al. .... 711/207 |
| 6,012,133 A * | 1/2000 | Shadan et al. ................. 711/207 |

(Continued)

OTHER PUBLICATIONS

IEEE Journal of Solid-State Circuits, vol. 41, No. 3, Mar. 2006, pp. 712-727 article entitled "Content-Addressable Memory (CAM) Circuits and Architectures: A Tutorial and Survey" by K. Pagiamtzis et al.

(Continued)

*Primary Examiner* — Sheng-Jen Tsai
(74) *Attorney, Agent, or Firm* — Dennis Jung, Esq.; Kevin P. Radigan, Esq.; Heslin Rothenberg Farley & Mesiti P.C.

(57) ABSTRACT

A program product, a translation lookaside buffer and a related method for operating the TLB is provided. The method comprises the steps of: a) when adding an entry for a virtual address to said TLB testing whether the attribute data of said virtual address is already stored in said CAM and if the attribute data is not stored already in said CAM, generating tag data for said virtual address such that said tag data is different from the tag data generated for the other virtual addresses currently stored in said RAM and associated to the new entry in said CAM for the attribute data, adding the generated tag data to said RAM and to the associated entry in said CAM, and setting a validity flag in said CAM for said associated entry; else if the attribute data is stored already in said CAM, adding the stored attribute data to the entry in said RAM for said virtual address; and when performing a TLB lookup operation: reading the validity flag and the tag data from the entry in said CAM, which is associated to the entry in said RAM for said virtual address, and simultaneously reading the absolute address and the tag data from the entry in said RAM for said virtual address, and generating a TLB hit only if the tag data read from said CAM is valid and matches the tag data read from said RAM.

20 Claims, 6 Drawing Sheets

U.S. PATENT DOCUMENTS

| | | | |
|---|---|---|---|
| 6,078,987 A * | 6/2000 | Kongetira | 711/108 |
| 6,286,091 B1 * | 9/2001 | Park | 711/207 |
| 6,493,812 B1 * | 12/2002 | Lyon | 711/207 |
| 6,560,689 B1 * | 5/2003 | Mathews et al. | 711/204 |
| 6,681,312 B1 * | 1/2004 | Maekawa | 711/207 |
| 2002/0073282 A1 * | 6/2002 | Chauvel et al. | 711/122 |
| 2002/0087825 A1 * | 7/2002 | Nagapudi et al. | 711/207 |
| 2004/0052133 A1 * | 3/2004 | Yiu et al. | 365/202 |
| 2005/0108497 A1 * | 5/2005 | Bridges et al. | 711/207 |
| 2005/0160250 A1 * | 7/2005 | Yoshimi | 711/207 |
| 2006/0026382 A1 * | 2/2006 | Hirano et al. | 711/207 |
| 2007/0211532 A1 * | 9/2007 | Gonzalez et al. | 365/185.11 |
| 2010/0318763 A1 * | 12/2010 | Singh et al. | 711/207 |

OTHER PUBLICATIONS

"z/Architecture Printiples of Operation", Fifth Edition, Sep. 2005, IBM Corporation, publication No. SA22-7832-03.

* cited by examiner

TRANSLATION LOOKASIDE BUFFER AND RELATED METHOD AND PROGRAM PRODUCT UTILIZED FOR VIRTUAL ADDRESSES

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

1. Field of the Invention

The present invention relates to the virtual address translation in a central processing unit (CPU).

2. Description of Background

A translation lookaside buffer (TLB) is a cache in a CPU that is used to improve the speed of virtual address translations. It references the most recently used page table entries and translates linear addresses into physical addresses directly without having to access page tables and other translation tables from main memory.

In many server computer systems a CPU is dynamically assigned to different tasks or even virtualization levels (e.g., host, guest environment), with the result that the TLB of the CPU has to buffer entries of different attributes, i.e. for different tasks etc. An example for such computer environment is described in the U.S. Pat. No. 5,317,705. For various reasons the operating system executed by a CPU has to purge all associated TLB entries of the task, this CPU is currently assigned to; e.g. when a translation table in main memory is modified. In this case it is desirable to keep TLB entries of other tasks, but purge only those entries, randomly distributed in the TLB, associated to the current task.

A common method used to implement this purging process is to use a content-addressable memory (CAM) implementation for the TLB, which is usually composed of static random access memory (SRAM) with added comparison circuitry for each location in a random access memory (RAM) that enable a search operation to complete in a single clock cycle. This extra circuitry increases manufacturing cost and also increases power dissipation since every comparison circuit is active on every clock cycle.

In less costly implementations only RAM circuitries are used and the hardware scans through all RAM locations, compares each data word outside the RAM, and purges the data word in RAM in case of a match. This "TLB table walking" method is extremely time-consuming since every TLB RAM location must be read-out, compared and written back in case of a match.

SUMMARY OF THE INVENTION

The shortcomings of the prior art are overcome and additional advantages are provided through the provision of a program product, a translation lookaside buffer and a related method for operating the TLB (translation lookaside buffer) for virtual addresses of a computer system, wherein the TLB entries are stored in a RAM (random access memory) of said TLB, and wherein a valid entry in the RAM is associated to an entry in a CAM (content-addressable memory) of the TLB, and wherein an entry in the CAM comprises attribute data for an associated virtual address. The method comprises the steps of: a) when adding an entry for a virtual address to said TLB testing whether the attribute data of said virtual address is already stored in said CAM and if the attribute data is not stored already in said CAM, generating tag data for said virtual address such that said tag data is different from the tag data generated for the other virtual addresses currently stored in said RAM and associated to the new entry in said CAM for the attribute data, adding the generated tag data to said RAM and to the associated entry in said CAM, and setting a validity flag in said CAM for said associated entry; else if the attribute data is stored already in said CAM, adding the stored attribute data to the entry in said RAM for said virtual address; and when performing a TLB lookup operation: reading the validity flag and the tag data from the entry in said CAM, which is associated to the entry in said RAM for said virtual address, and simultaneously reading the absolute address and the tag data from the entry in said RAM for said virtual address, and generating a TLB hit only if the tag data read from said CAM is valid and matches the tag data read from said RAM.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The exemplary embodiment as will be discussed below, provides for a TLB compatible to an IBM System z architecture as specified in "z/Architecture Principles of Operation", Fifth Edition, September 2005, International Business Machines Corporation, publication number SA22-7832-03. For future secondary TLBs compatible to the System z architecture approximately 4000 TLB entries are needed. For such large arrays, a table walk is very time consuming. A corresponding large CAM takes considerable effort in men years for the implementation. This embodiment, however, is can be implemented using many other computer system architectures and platforms and this example in only provided to ease understanding.

Figure 1:
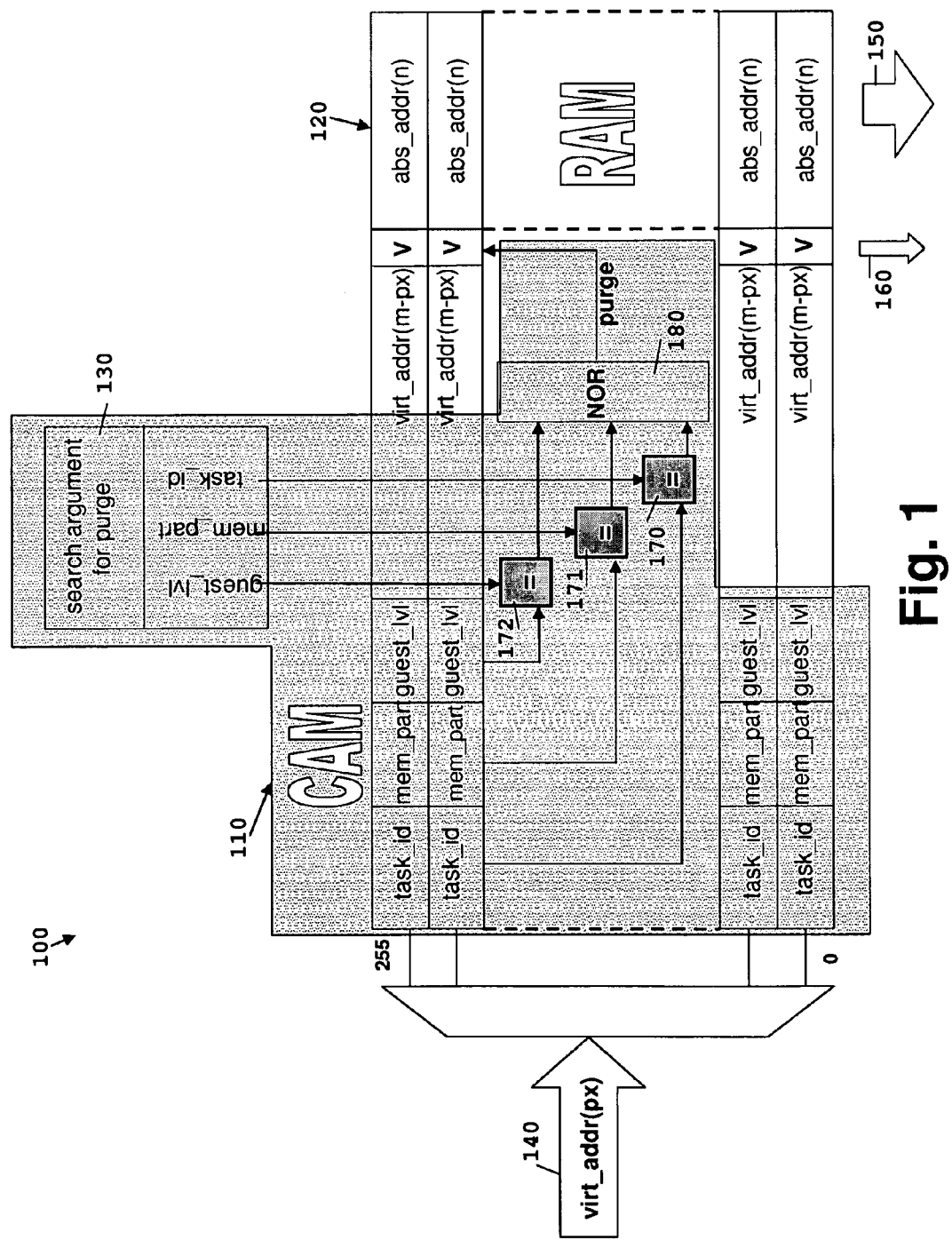
FIG. 1 is a block diagram illustrating an implementation of a TLB.

FIG. 1 shows a TLB 100 being part of a CPU compatible to the System z architecture with a combination of a CAM and a RAM. In order to simplify the illustration, no details with respect to the hierarchical structure of the TLB 100 are provided (e.g. no region and segment indices are shown). TLB 100 comprises a CAM 110, a RAM 120 and a search argument input 130 to the purge logic circuit, which is responsible for purging entries from the TLB 100. Both the CAM 110 and the RAM 120 have 256 entries numbered 0, ..., 255, and each entry in the CAM 110 has a corresponding entry in the RAM 120. A page index 140 of a virtual address (denoted as virt_addr(px)) is used to address both the CAM 110 and the RAM 120 in parallel. In a lookup operation for a virtual address, an absolute memory address 150 together with the valid flag 160, which indicates if the absolute memory address 150 is valid, is provided to other CPU units, such as the instruction-fetch or load-store unit of the CPU.

The following attributes are related to certain virtualization and operating capabilities provided by the System z architecture (e.g., LPAR: Logic Partitioning, guest operating systems, and tasks) and used to classify the entries of the TLB 100:

the task ID (denoted as task_id), for which the TLB entry was formed;

the memory partition ID (denoted as mem_part) used to identify the storage area the main memory is divided into;

the guest level (denoted as guest_lvl) in which the user program executes.

Each entry of the TLB RAM 120 is assigned to a certain task, partition, and guest level. Therefore, the following purge scenarios are applicable in the TLB RAM 120:

purge all entries;

purge all entries of a certain task ID;

purge all entries of a certain memory partition ID;

purge all entries of a certain guest level ID;

combinations of the former scenarios, e.g. purging all entries associated to a certain task ID and a certain guest level ID, etc.

In general, the design of the CAM 110 has to accommodate all possible purge requirements as specified by the System z architecture and by the micro architecture of the CPU.

The page index 140 is used to address an entry in the CAM 110 and RAM 120. The virtual address reduced by the page index bits (denoted as virt_addr(m-px)) is stored in the corresponding entry in the RAM 120 together with the absolute memory address associated to the virtual address (denoted as abs_addr(n)) and a valid flag (denoted as V), which indicates if the TLB entry is valid. Therefore, disadvantages of the TLB 100 are that for a particular page index it has to store all attribute tags and each entry has to comprise a separate purge circuit.

When a purge operation is performed by the TLB 100 (e.g. when a System z IPTE or ITDE instruction is executed), the search argument 130 is compared in parallel with the associated attribute tags of all TLB entries and if a match is found the valid flag 160 is turned off. For each entry in the CAM 110, comparators 170, 171, 172 will be used to compare selectively task ID, memory partition ID and guest level ID in an entry of the CAM 110 with the search argument 130. The outputs of the comparators 170, 171, 172 are used as inputs of a NOR gate 180. If at least one match is found by the comparators 170, 171, and 172, the output of the NOR gate 180 is 0, otherwise 1. If the output of the NOR gate 180 is 0, the valid flag in the corresponding entry in the RAM 120 is also set to zero and is not changed if the output of the NOR gate 180 is 1. Consequently, all entries in the TLB 100 with task ID and/or memory partition ID and/or guest level ID equal to the search argument 130 are purged.

The TLB in accordance with the present invention is also composed of two hardware units: Compared to the prior art TLB 100, a very small attribute CAM, containing parent entries and a relatively small TLB RAM, containing child entries. Parent and child entries are synchronized with tags. For simplicity the attributes used to classify the TLB entries and the selective purge operations are identical to the ones used in the above prior art TLB description.

Figure 2:
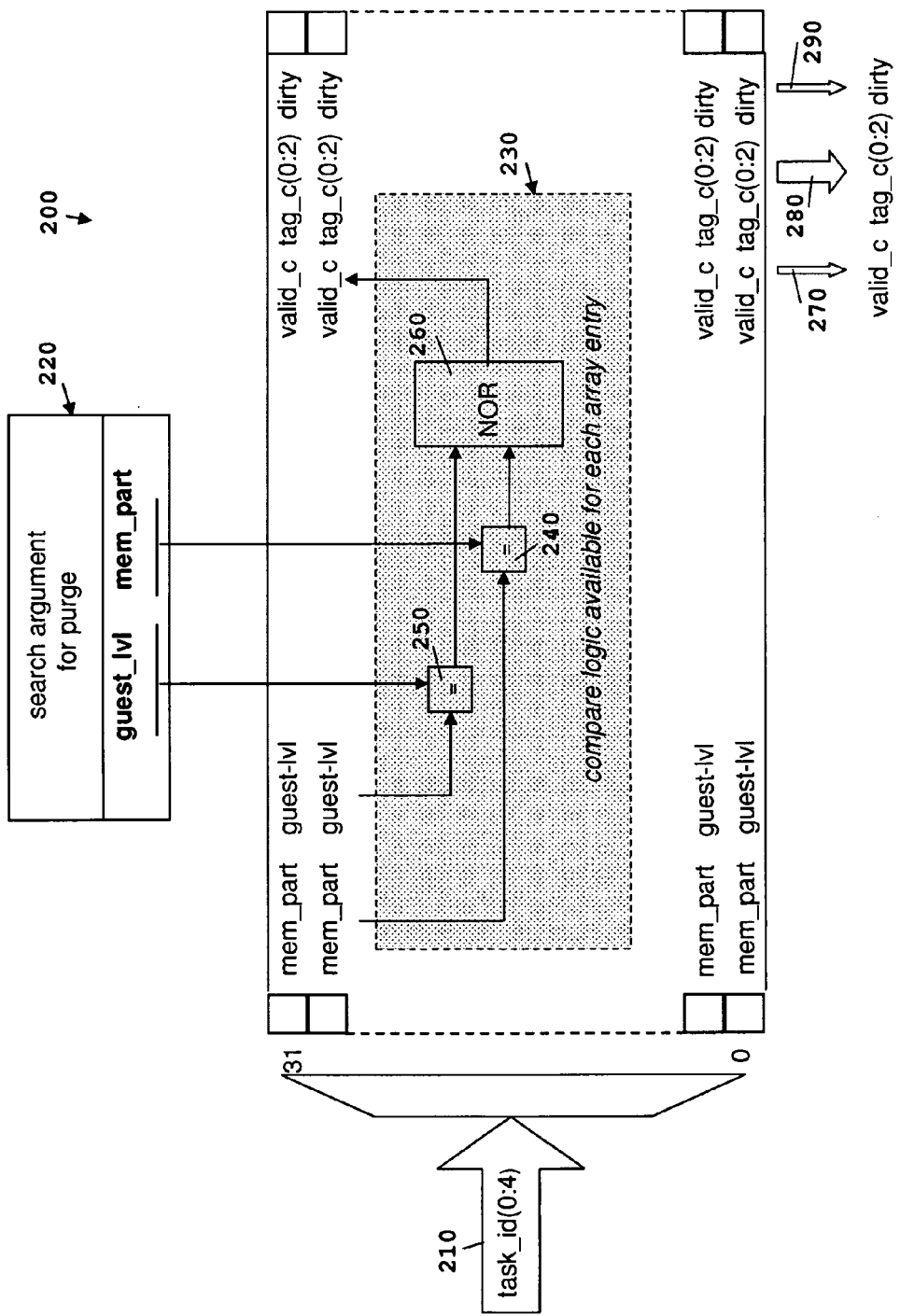
FIG. 2 is a block diagram illustrating a TLB attribute CAM in accordance with the present invention.

Because of the very small size of the attribute CAM, there is no necessity to implement the CAM function using individual storage cells, instead it may be implemented using random logic macros and standard registers. This basic structure can be as simple as a register file for which the user supplies a memory address and the RAM returns the data word stored at that address, as shown for the attribute CAM 200 in FIG. 2. Attribute CAM 200 comprises only 32 entries numbered 0, ..., 31.

Instead (of the page index part) of the virtual address, a System z task ID 210 (denoted as task_id(0:4)) is used to address the register file of the attribute CAM 200. This allows following a more general design rule: The input address of the attribute CAM 200 should be derived of the next level of "hierarchy" of the used attributes; for a System z CPU this is the task ID. This guarantees the best alteration of all input addresses and thus diminishes the background scrubbing frequency.

Input to the attribute CAM 200 is the search argument 220. All entries associated to a task ID are purged using the compare logic 230 by resetting the valid entry bit (denoted as valid_c). This does not require any real CAM operation; instead the data containing the valid entry bit is read out and written back, with the valid entry bit set to 0. In this case, all entries in the TLB RAM associated to this task ID are purged. Other attribute tags such as the memory partition ID or the guest level, addressed by this task_id may also be inspected, thus making it possible to suppress purging (resetting the valid entry bit) if these attributes do not match the search argument.

The CAM function of the attribute CAM 200 is used for purge requests that do not specify a certain task ID, e.g. if all entries of a certain guest level ID, or memory partition ID, or combination of both have to be purged.

The CAM purge operation is performed by a compare logic 230 circuit, which is available for every entry in the attribute CAM 200. The compare logic 230 comprises two comparators 240 and 250 and a NOR gate 260. The comparators 240 and 250 compare the memory partition ID and the guest level ID with the search argument. The outputs of the comparators 240 and 250 serve as inputs to the NOR gate 260. If the output of the NOR gate 260 is zero, the associated valid entry bit (denoted as valid_c_tag) in the entry of the Attribute CAM 200 is also set to zero. If the memory partition ID or the guest level ID do not match, the valid bit of the entry is left unchanged. It should be obvious, that the compare logic 230 selectively may compare one, or the other, or both search arguments.

The output signals 270 (denoted as valid_c) and 280 (denoted as tag_c(0:2)) of the attribute CAM 200 are used in the TLB hit logic of the TLB as explained later on. The output signal 270 provides the valid flag of the entry addressed by the task ID 210, which indicates if this entry is valid. The output signal dirty bit 290 of the attribute CAM 200 together with the (exhausted) tag count is used to inhibit storing of new entries. In this case, the background scrubbing process performed by the TLB did not free up new tag values.

Figure 3:
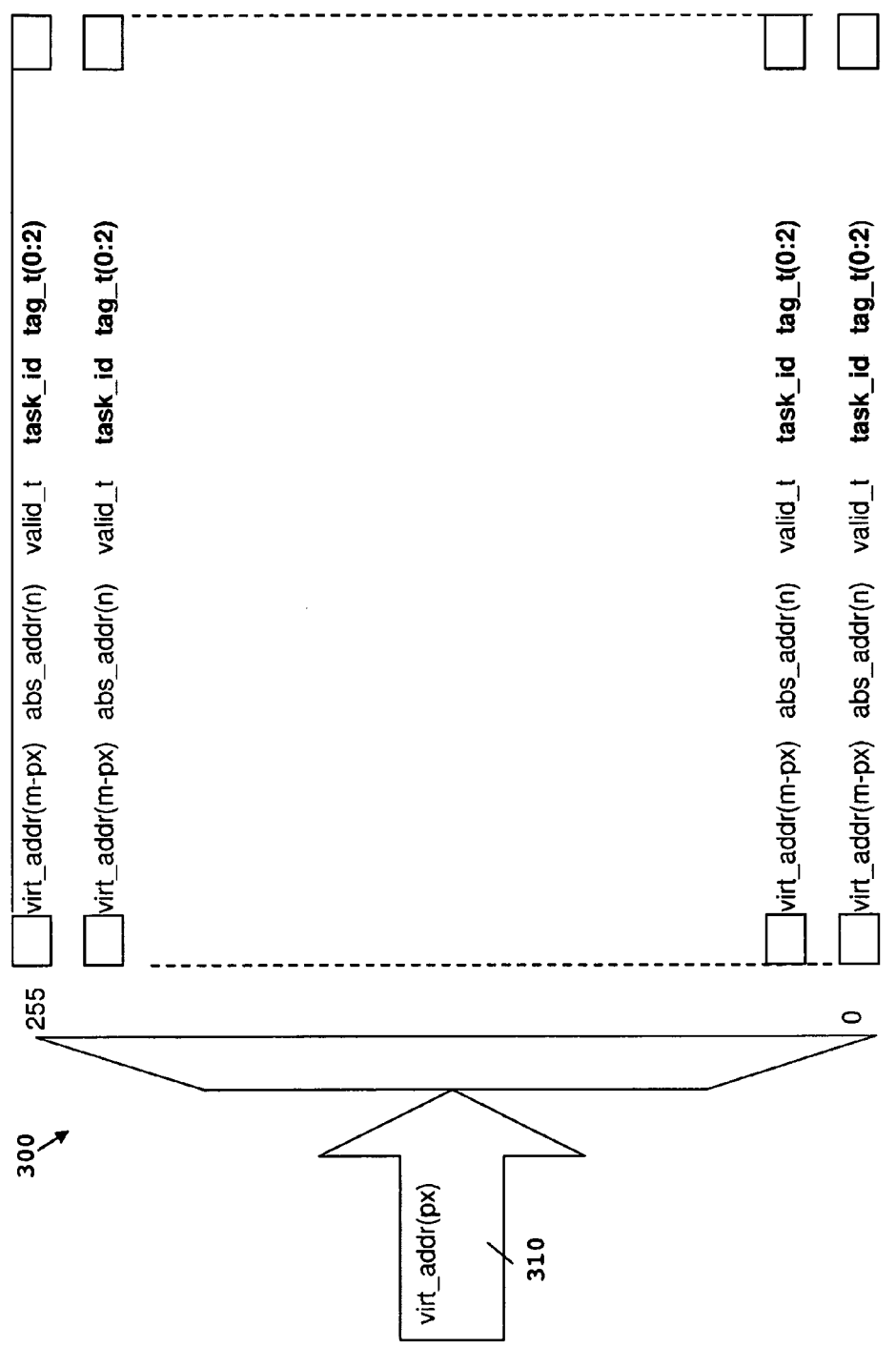
FIG. 3 is a block diagram illustrating a TLB RAM in accordance with the present invention.

The TLB RAM is organized as an n-set by four-way set associative CPU cache, which maps each page in a virtual memory to a page in physical memory. Because of simplicity reasons, FIG. 3 shows one single array 300 of the TLB RAM with 256 entries numbered 0, ..., 255 only. A page index 310 of a System z virtual address is used to address an entry in the TLB RAM. An entry in the array 300 comprises the data usually stored in a System z TLB entry, e.g. the absolute address, high order virtual address bits truncated on the right by the number of page index bits, and a tag (denoted as valid_t) indicating the validity of the TLB entry. Besides this data, the TLB RAM buffers in an entry additionally the task ID, for which the entry was formed and the tag bits tag_t(0:2). When the entry is stored in the array 300, the content of these tag bits is identical to the tag_c(0:2) stored in the corresponding entry in the attribute CAM 200.

Figure 4:
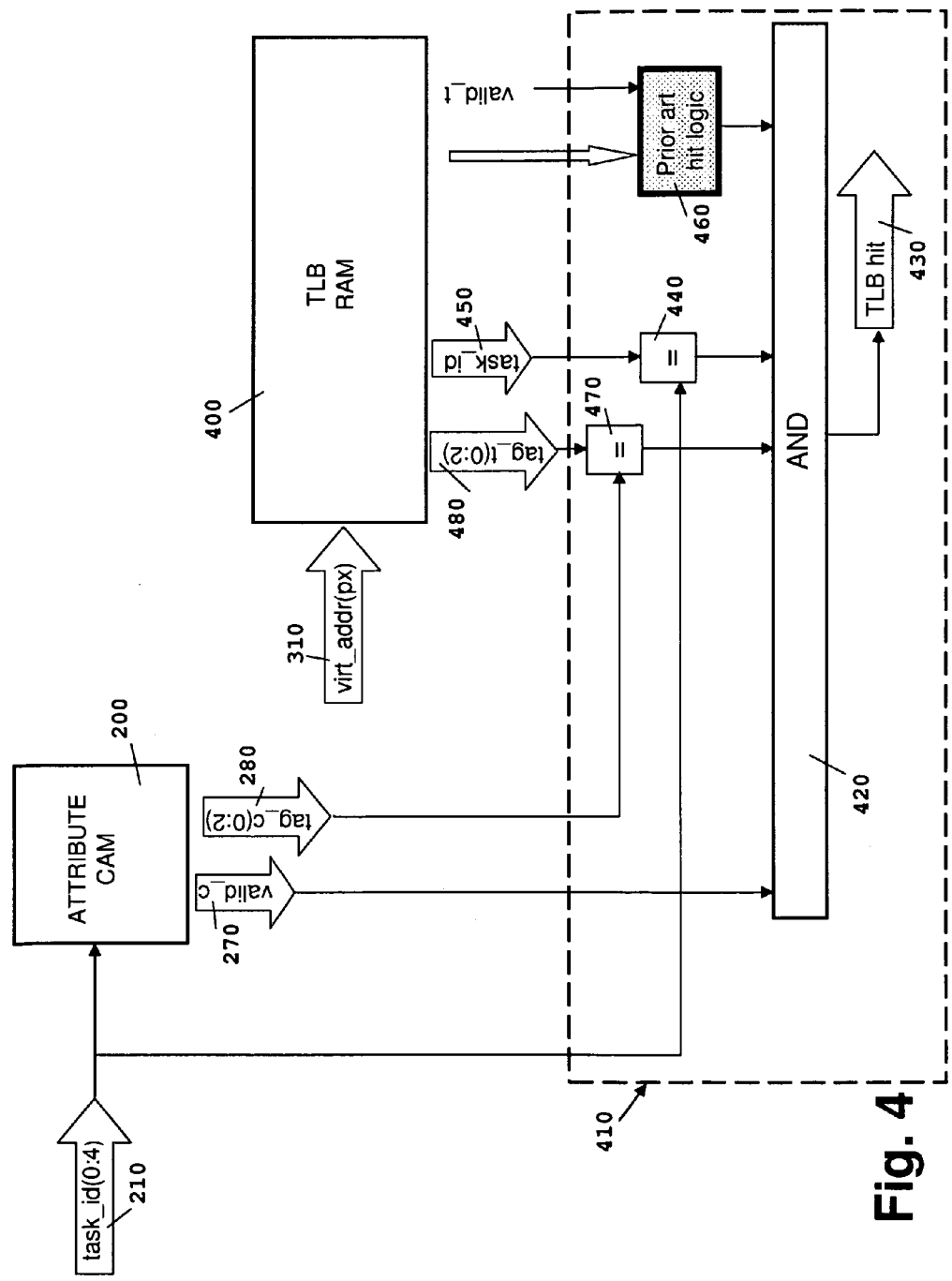
FIG. 4 is a block diagram illustrating a TLB hit logic circuit in accordance with the present invention.

The TLB hit logic 410 with the necessary interconnections between attribute CAM 200 and the TLB RAM 400 is shown in FIG. 4. With regard to the new invalidation scheme in accordance with the present invention, the hit logic 410 needs to perform the following steps extending beyond the prior art:

a) Testing whether the task ID 210 applied to the attribute CAM 200 matches the task ID stored in the TLB RAM 400: In case of matching values the entry found in TLB RAM 400 under the page index 310 was formed for the current active System z task;

b) Testing whether the entry selected by the current task ID 210 in attribute CAM 200 is valid: A previous purge operation performed by the purge logic 230 might have purged this entry;

c) Testing if the tag value tag_c in the entry in the attribute CAM 200 matches the tag value tag_t in the entry in the tag RAM 400: In case of a match the child entry in the entry in the TLB is connected to the parent entry in the attribute CAM 200.

For these steps an AND gate 420 is used as part of the hit logic 410. The output signal of the AND gate 420 is connected to the output signal 430 of the hit logic 410. The output signal 430 indicates a TLB hit therefore.

For step a) the output of a comparator 440 is provided as an input to the AND gate 420. The inputs of the comparator 440 are the task ID 210 and the task ID 450 stored in the entry of the TLB RAM 400 addressed by the page index 310. In case of a mismatch between task ID 210 and task ID 450, the output of the comparator is zero and the AND gate 420 ensures therefore that the output signal 430 does not indicate a TLB hit.

For step b) the output signal 270 of the attribute CAM 200 and the output signal of a prior art hit logic 460 circuit for the TLB RAM 400 are used as further inputs of the AND gate 420. Only in case when both valid flags in the corresponding entries in the attribute CAM 200 and the TLB RAM 400 (as addressed by the task ID 210 and the page index 310 respectively) are valid, the AND gate 420 generates a TLB hit indication in its output signal 430.

For step c) the output signal 280 of the attribute CAM 200 is compared with the output signal 480 of the TLB RAM 400. This comparison is performed by a comparator 470 in the hit logic 410. The output of the comparator 470 is provided as a further input of the AND gate 420. Therefore, the AND gate 420 generates a TLB hit indication in its output signal 420 only in case of a match between the output signals 280 and 480.

The additional compare logic circuits 420, 440 and 470 in the hit logic 410 do not impact the cycle time for the TLB lookup operation, because they execute in parallel to the prior art hit logic 460.

Figure 5:
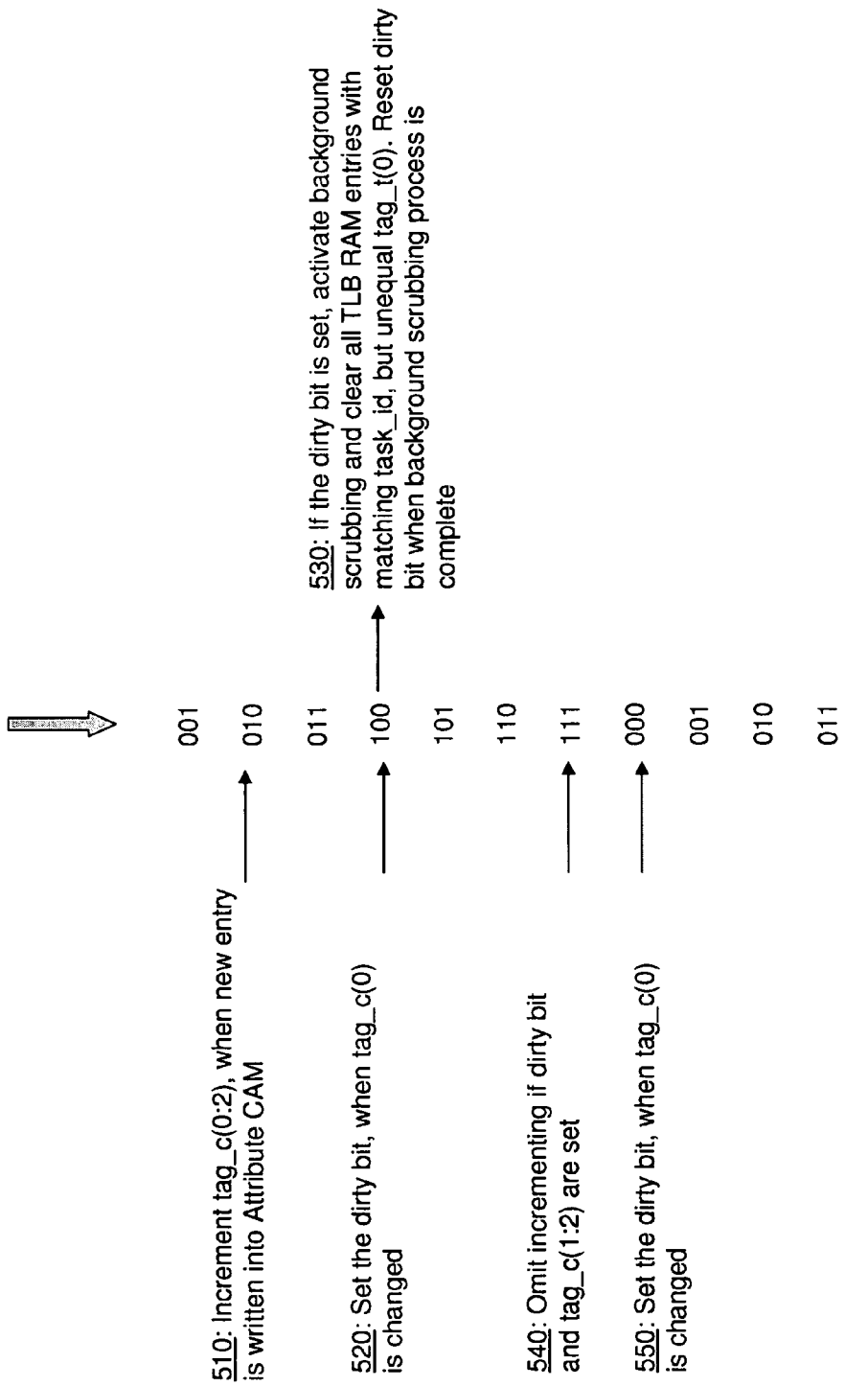
FIG. 5 is a block diagram illustrating a method in accordance with the present invention.

The consecutive steps for tag generation and background scrubbing are shown in FIG. 5. In order to prevent multiple uses of the same tags, the background scrubbing process is performed. Background means, this process is active when the TLB is not used for purge, lookup, or write operations, which are so-called foreground operations. The background operation is stopped, whenever a request for a foreground operation is received, to be resumed if the foreground process is finished. Therefore, this background operation does not impact the performance of the TLB.

Whenever a new entry is written to the attribute CAM 200 (step 500), the tag data (tag_c(0:2)) of the current entry (stored in the attribute CAM 200) is incremented by 1 (step 510) and stored with the new TLB entry in the attribute CAM 200 and the TLB RAM 300 (tag_t(0:2)). A new entry written into the TLB RAM 300 for a task_id 210 already being valid (valid_c=1) gets a copy of the tag_c(0:2) as tag_t(0:2). In step 520 the dirty bit 290 is set when tag_c(0) is changed (i.e. the high-order tag bit). If set, the dirty bit 290 signals the background scrubbing routine of the TLB that is has to purge TLB entries (step 530). During the background scrubbing process the valid tag bit (valid_t) is set to zero in the TLB RAM 400, but only for those TLB entries with matching task ID and with different tag_t(0). When the background scrubbing process is complete, the dirty bit 290 is reset.

Likewise, replacement of the tag(0:2) for this task ID is still allowed, provided it does not change the tag_c(0). In other words, tags '000' to '011' can be used fine. When tag '100' gets used, the dirty bit 290 is set, signalling to the scrubbing logic that entries of the TLB RAM 400 with tags '000' to '011' with matching task ID have to be scrubbed. Tags '101' to '111' can be still used during this background scrubbing process, but '000' to '011' cannot be (re-)used until the background scrubbing process is complete and the dirty bit 290 is reset.

The following steps summarize the sequential steps of the background scrubbing process:

aa) Increment the value of the tag bits (tag_c(0:2)), when an entry of the attribute CAM 200 is replaced. Omit the incrementing of the tag bits if the dirty bit 290 and tag_c(1:2) are already set (step 540). In this case do not replace this entry and continue with step cc).

bb) Set the dirty bit 290 to the value of one, when tag_c(0) is changed (step 550).

cc) If the dirty bit 290 is set, activate the background scrubbing process (step 530): Clear all entries of the TLB RAM 400 with matching task ID but unequal tag_t(0), and reset the dirty bit 290 if all entries of the TLB RAM 400 have been inspected.

In other words, half of the tag combinations are usable, while half are being scrubbed. The dirty bit 290 is inspected, again and again, when the TLB is used to lookup a physical address or when a new value is stored. The number of used tag bits may vary, but impacts the scrubbing frequency.

When a TLB lookup operation is performed in every CPU cycle, the inventive TLB structure could introduce performance problems due to an on-going background scrubbing process. However, in many cases (as in usual System z secondary TLBs) such scenario is unlikely.

Additional embodiments of the present invention can also be implemented. For example, the described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
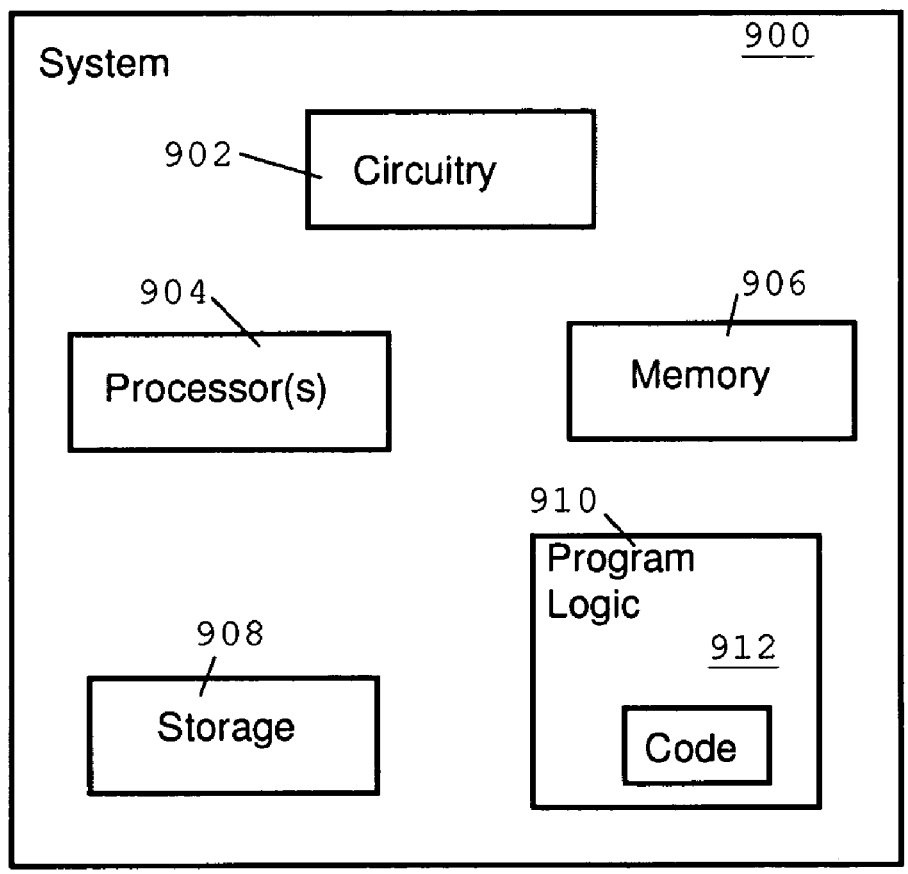
FIG. 6 is a block diagram of a system in which certain embodiments may be implemented.

FIG. 6 illustrates a block diagram of a computer system 900 in which certain embodiments may be implemented. The system 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

The foregoing description of the embodiments has been presented for the purposes of illustration and description. It is not intended to be exhaustive or to limit the embodiments to the precise form disclosed. Many modifications and variations are possible in light of the above teaching.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for operating a TLB (translation lookaside buffer) for virtual addresses of a computer system, wherein the TLB entries are stored in a RAM (random access memory) of said TLB, and wherein a valid entry in said RAM is associated to an entry in a CAM (content-addressable memory) of said TLB, and wherein an entry in said CAM comprises attribute data for an associated virtual address, the attribute data comprising a task ID of a processor task of said computer system for which the entry was formed, said method comprising:
    a) when adding an entry for a virtual address to said TLB, testing whether the attribute data of said virtual address is already stored in said CAM and if the attribute data is not stored already in said CAM, generating tag data for said virtual address such that said tag data is different from the tag data generated for the other virtual addresses currently stored in said RAM and associated to the new entry in said CAM for the attribute data, adding the generated tag data to said RAM and to the associated entry in said CAM, and setting a validity flag in said CAM for said associated entry;
    whereas if the attribute data is stored already in said CAM, adding the stored attribute data to the entry in said RAM for said virtual address; and
    b) when performing a TLB lookup operation: applying the task ID of the attribute data to the CAM to select the entry in the CAM and read the validity flag and the tag data from the entry in said CAM, absent applying the virtual address to the CAM to select the entry and to read the validity flag and the tag data, which entry in the CAM is associated to the entry in said RAM for said virtual address, and separately addressing the RAM, in parallel to the applying the task ID of the attribute data to the CAM, by applying at least a portion of the virtual address to the RAM to select the entry in the RAM and read the an absolute address, a task ID, and the tag data from the entry in said RAM for said virtual address, thereby reading in parallel the tag data from the entry in the CAM and the task ID and tag data from the entry in the RAM for comparison of the tag data from the entry in the CAM with the tag data from the entry in the RAM, and for comparison of the task ID applied to the CAM to select the entry in the CAM with the task ID stored in the entry in RAM, and generating a TLB hit only if (i) the tag data read from said CAM is valid and matches the tag data read from said RAM, and (ii) the task ID applied to the CAM to select the entry in the CAM matches the task ID stored in the entry in RAM.

2. The method of claim 1, wherein the attribute data for a virtual address further comprises at least one of a memory partition of said computer system and a guest level in which the user program addressed by the task ID executes.

3. The method of claim 2, wherein multiple TLB entries with the same attribute data are purged by invalidating the validity flag of the associated entry stored in said CAM.

4. The method of claim 1, wherein TLB entries with the same attribute data are purged by invalidating the validity flag of the associated entry stored in said CAM.

5. The method of claim 4, wherein the validity flag for an entry of said CAM is part of the tag stored in the entry.

6. The method of claim 4, wherein entries are scrubbed from the TLB in order to prevent the multiple uses of tags.

7. The method of claim 6, wherein the scrubbing of entries is performed as a background process.

8. A computer program product for operating a TLB (translation lookaside buffer) for virtual addresses of a computer system, the computer program product comprising:
    a non-transitory storage medium readable by a processor and storing instructions for execution by the processor to perform a method, wherein the TLB entries are stored in a RAM (random access memory) of said TLB, and wherein a valid entry in said RAM is associated to an entry in a CAM (content-addressable memory) of said TLB, and wherein an entry in said CAM comprises attribute data for an associated virtual address, the attribute data comprising a task ID of a processor task of said computer system for which the entry was formed, said method comprising:
    a) when adding an entry for a virtual address to said TLB: testing whether the attribute data of said virtual address is already stored in said CAM and if the attribute data is not stored already in said CAM, generating tag data for said virtual address such that said tag data is different from the tag data generated for the other virtual addresses currently stored in said RAM and associated to the new entry in said CAM for the attribute data, adding the generated tag data to said RAM and to the associated entry in said CAM, and setting a validity flag in said CAM for said associated entry;
    whereas if the attribute data is stored already in said CAM, adding the stored attribute data to the entry in said RAM for said virtual address; and
    b) when performing a TLB lookup operation: applying the task ID of the attribute data to the CAM to select the entry in the CAM and read the validity flag and the tag data from the entry in said CAM, absent applying the virtual address to the CAM to select the entry and to read the validity flag and the tag data, which entry in the CAM is associated to the entry in said RAM for said virtual address, and separately addressing the RAM, in parallel to the applying the task ID of the attribute data to the CAM, by applying at least a portion of the virtual address to the RAM to select the entry in the RAM and read an absolute address, a task ID, and the tag data from the entry in said RAM for said virtual address, thereby reading in parallel the tag data from the entry in the CAM and the task ID and tag data from the entry in the RAM for comparison of the tag data from the entry in the CAM with the tag data from the entry in the RAM, and for comparison of the task ID applied to the CAM to select the entry in the CAM with the task ID stored in the entry in RAM, and generating a TLB hit only if (i) the tag data read from said CAM is valid and matches the tag data read from said RAM, and (ii) the task ID applied to the CAM to select the entry in the CAM matches the task ID stored in the entry in RAM.

9. The computer program product of claim 8, wherein the attribute data for a virtual address further comprises at least one of a memory partition of said computer system and a guest level in which the user program addressed by the task ID executes.

10. The computer program product of claim 9, wherein TLB entries with the same attribute data are purged by invalidating the validity flag of the associated entry stored in said CAM.

11. The computer program product of claim 8, wherein TLB entries with the same attribute data are purged by invalidating the validity flag of the associated entry stored in said CAM.

12. The computer program product of claim 11, wherein the validity flag for an entry of said CAM is part of the tag stored in the entry.

13. The computer program product of claim 11, wherein entries are scrubbed from the TLB in order to prevent the multiple uses of tags.

14. The computer program product of claim 13, wherein the scrubbing of entries is performed as a background process.

15. A computer system, the computer system comprising:
a memory; and
a processor, in communications with the memory, wherein the computer system is configured to perform a method for operating a TLB (translation lookaside buffer) for virtual addresses of the computer system, wherein the TLB entries are stored in a RAM (random access memory) of said TLB, and wherein a valid entry in said RAM is associated to an entry in a CAM (content-addressable memory) of said TLB, and wherein an entry in said CAM comprises attribute data for an associated virtual address, the attribute data comprising a task ID of a processor task of said computer system for which the entry was formed, said method comprising:
  a) when adding an entry for a virtual address to said TLB, testing whether the attribute data of said virtual address is already stored in said CAM and if the attribute data is not stored already in said CAM, generating tag data for said virtual address such that said tag data is different from the tag data generated for the other virtual addresses currently stored in said RAM and associated to the new entry in said CAM for the attribute data, adding the generated tag data to said RAM and to the associated entry in said CAM, and setting a validity flag in said CAM for said associated entry;
  whereas if the attribute data is stored already in said CAM, adding the stored attribute data to the entry in said RAM for said virtual address; and
  b) when performing a TLB lookup operation: applying the task ID of the attribute data to the CAM to select the entry in the CAM and read the validity flag and the tag data from the entry in said CAM, absent applying the virtual address to the CAM to select the entry and to read the validity flag and the tag data, which entry in the CAM is associated to the entry in said RAM for said virtual address, and separately addressing the RAM, in parallel to the applying the task ID of the attribute data to the CAM, by applying at least a portion of the virtual address to the RAM to select the entry in the RAM and read an absolute address, a task ID and the tag data from the entry in said RAM for said virtual address, thereby reading in parallel the tag data from the entry in the CAM and the task ID and tag data from the entry in the RAM for comparison of the tag data from the entry in the CAM with the tag data from the entry in the RAM, and for comparison of the task ID applied to the CAM to select the entry in the CAM with the task ID stored in the entry in RAM, and generating a TLB hit only if (i) the tag data read from said CAM is valid and matches the tag data read from said RAM, and (ii) the task ID applied to the CAM to select the entry in the CAM matches the task ID stored in the entry in RAM.

16. The computer program product of claim 15, wherein the attribute data for a virtual address further comprises at least one of a memory partition of said computer system and a guest level in which the user program addressed by the task ID executes.

17. The computer program product of claim 15, wherein TLB entries with the same attribute data are purged by invalidating the validity flag of the associated entry stored in said CAM.

18. The computer program product of claim 17, wherein the validity flag for an entry of said CAM is part of the tag stored in the entry.

19. The computer program product of claim 17, wherein entries are scrubbed from the TLB in order to prevent the multiple uses of tags.

20. The computer program product of claim 19, wherein the scrubbing of entries is performed as a background process.

\* \* \* \* \*